United States Patent [19]

Willyard

[11] 4,070,982
[45] Jan. 31, 1978

[54] CYLINDER-DRIVEN MARINE PROPULSION SYSTEM

[76] Inventor: James C. Willyard, 14204 Knotley Road, Silver Spring, Md. 20904

[21] Appl. No.: 697,469

[22] Filed: June 18, 1976

Related U.S. Application Data

[62] Division of Ser. No. 559,225, March 17, 1975, Pat. No. 3,978,814, which is a division of Ser. No. 376,334, July 5, 1973, Pat. No. 3,888,202.

[51] Int. Cl.$^2$ ............................................. B63H 11/02
[52] U.S. Cl. ..................................................... 115/16
[58] Field of Search ..................... 115/14, 15, 16, 23, 115/49, 50, 53; 415/209; 416/4

[56] References Cited

U.S. PATENT DOCUMENTS

| 106,620 | 8/1870 | Rees | 115/49 |
|---|---|---|---|
| 212,638 | 2/1879 | Werner | 115/53 |
| 3,077,174 | 2/1963 | Cockerell | 115/23 |
| 3,083,677 | 4/1963 | Deubelbeiss | 115/53 |
| 3,274,966 | 9/1966 | Rethorst | 115/16 |
| 3,888,202 | 6/1975 | Willyard | 115/16 |

Primary Examiner—Trygve M. Blix
Assistant Examiner—Stuart M. Goldstein
Attorney, Agent, or Firm—Rose & Edell

[57] ABSTRACT

A marine propulsion system includes a hull-contained, open-ended duct extending from bow to stern along the bottom of a vessel, the top of the duct being disposed above the water line and all duct walls extending parallel to the axis of motion of the vessel. Buoyancy chambers extend along the top and sides of the duct from a location aft of the duct inlet to the stern and converge at their forward end to define a venturi throat. A reaction device, located aft of the duct inlet and forward of the venturi throat, imparts rearward flow velocity to water in the duct. In one embodiment the reaction device is a partially-submerged horizontally-extending cylinder oriented perpendicular to flow through the duct. The cylinder, when rotated, increases water flow velocity in the duct and additionally pumps the water toward the throat in which the water experiences further flow velocity increase. In a second embodiment the reaction device is an air nozzle which issues high velocity air into the duct in a rearward direction at a slight angle toward the water surface from a location above the surface.

9 Claims, 13 Drawing Figures

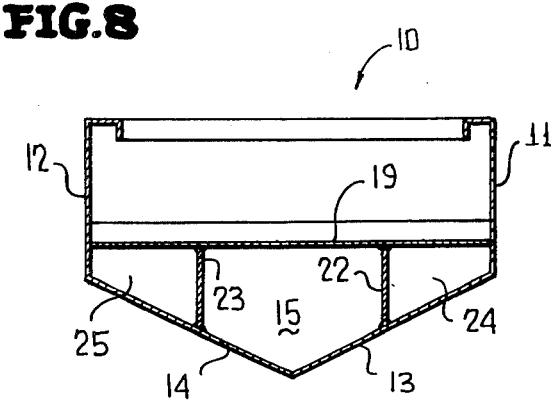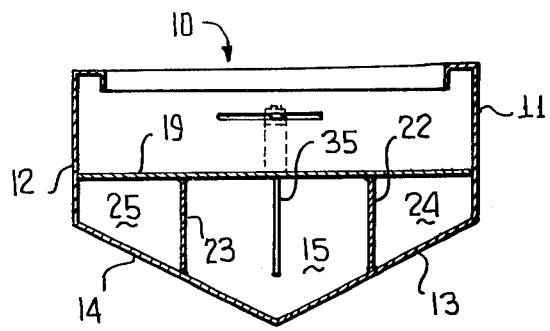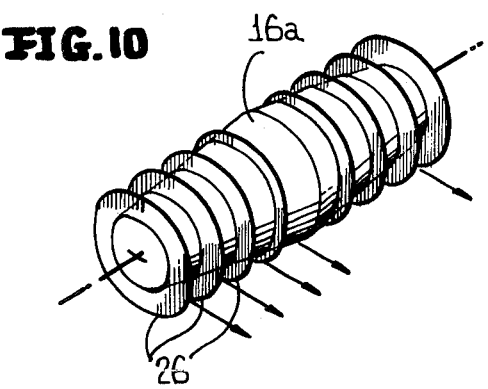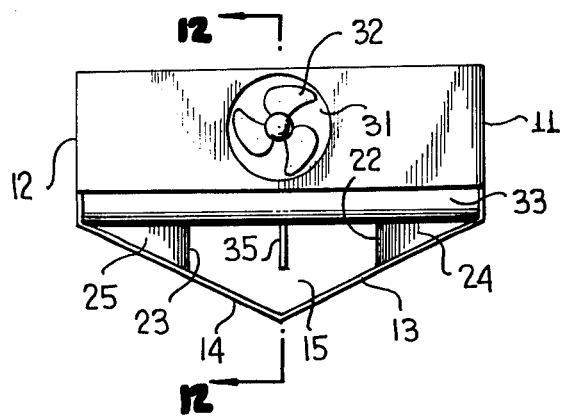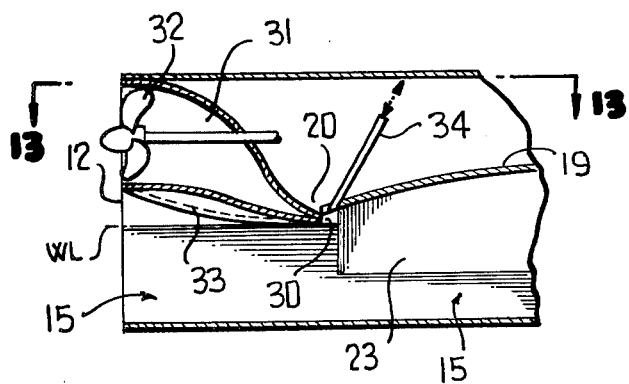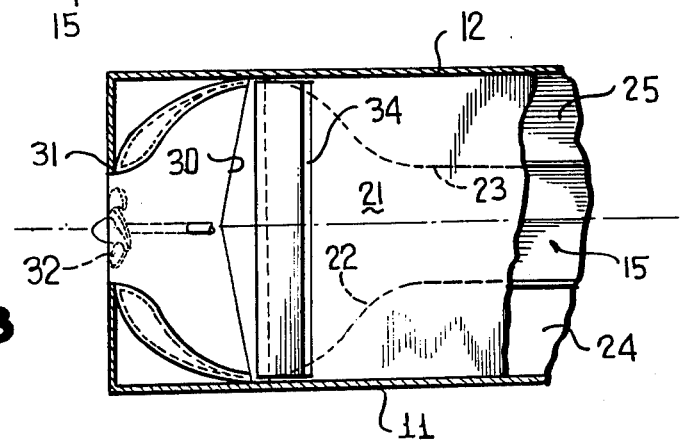

CYLINDER-DRIVEN MARINE PROPULSION SYSTEM

This is a division, of application Ser. No. 559,225 filed Mar. 17, 1975, now U.S. Pat. No. 3,978,814 which is a division of appln. Ser. No. 376,334, filed 7/5/73(U.S. Pat. No. 3,888,202).

BACKGROUND OF THE INVENTION

The present invention relates to improvements in marine propulsion systems. More particularly, the present invention relates to a marine propulsion system incorporated into the structural design of a vessel in order to optimize energy conversion and minimize power requirements.

Motion of marine vessels is resisted by frontal impact of air and water on the vessel and by frictional drag produced by wake and turbulence as the vessel is propelled. Numerous prior art attempts have been made to overcome these problems. For example, in U.S. Pat. No. 2,348,106 to Brian et al there is disclosed a bow-mounted blower which impels frontal air through a channel to beneath the vessel where it is impacted against the wake. As a result the air not only is prevented from impeding vessel motion, but is actually used to provide a propulsive force. The Brian et al system is efficient for its purpose; however, the impacting air tends to lift the vessel and support it on a cushion of air. Such air-cushioned vessels require significant power, both to effect lift and in causing rearward water flow which is not converted to vessel motion.

An analogous approach has been attempted in a hull displacement vessel, as described in U.S. Pat. No. 2,543,024 to Humphrey. Humphrey discloses a hull-containing channel in the form of an open-ended hollow water duct extending from bow to stern along the vessel bottom. A submerged nozzle issues air into the duct to react against the water and provide a propulsive force. The Humphrey system has its virtues but has a considerable number of disadvantages. For example, the inlet end of the water duct has a relatively small opening so that the frontal impact of water on the vessel remains significant. Moreover, the submerged nozzle results in air bubbles being issued into the duct, which bubbles produce frictional losses. Further, the presence of the nozzle in the duct impedes water flow and reduces efficiency. Still further, the nozzle in Humphrey is located at the rear of the duct which turns out to be a relatively inefficient location in that the issued air has little direct effect on the water located in the duct forward of the nozzle. Still further, the Humphrey approach requires a flat-bottomed vessel which is susceptible to both roll and yaw instability.

It is therefore an object of the present invention to provide a propulsion system and interrelated structural design for a marine craft of the hull displacement type wherein motion-resisting forces and power requirements are minimized.

It is another object of the present invention to provide an improved propulsion system for a hull displacement vessel of the type having a hull-contained water duct extending throughout its length, which system eliminates impediments to water flow through the duct, applies a reactive propulsion force at the optimum location in the duct, and permits the vessel to have a configuration which imparts a high degree of stability.

SUMMARY OF THE INVENTION

According to the present invention a displacement hull vessel is provided with a water duct extending along its bottom and which is only partially below the water line during operation. All of the walls of the duct are parallel to the flow direction throughout their length. The bottom walls define a V-configuration and provide vane-like control over positional stability. Additional stability is afforded by a pair of buoyancy chambers which extend along the top and respective sides of the duct from a location somewhat aft of the duct inlet to the stern of the vessel, the forward ends of the chambers converging in a downstream direction to form a venturi throat in the duct. A reaction device, located between the duct inlet and the throat, imparts propulsion forces to the vessel by applying reaction forces against the water in the duct. In one embodiment the reaction device is a rotatably-driven cylinder oriented with its axis horizontal and perpendicular to the direction of vessel motion. The lower portion of the cylinder is submerged and, when driven, imparts flow velocity to water in the duct. In addition the cylinder effectively pumps the water toward the venturi throat, thereby increasing the pressure forward of the throat and augmenting the flow velocity through the throat.

In a second embodiment the reaction device comprises a nozzle arranged to issue a high velocity jet of received frontal impact air from a location in the duct above the water line. The jet issues rearwardly at a small angle relative to the water surface. The air jet tends to aspirate air and water in the duct upstream of the nozzle location, thereby increasing flow velocity in the duct. In addition, the jet creates a positive pressure downstream of the nozzle. This positive pressure has a horizontal component which creates a reactive force on the water and directly imparts propulsion; a vertical component of the positive pressure is constrained by the enclosed duct to prevent lift and instead is converted to a propulsive force.

BRIEF DESCRIPTION OF THE DRAWINGS

The above and still further objects, features and advantages of the present invention will become apparent upon consideration of the following detailed description of specific embodiments thereof, especially when taken in conjunction with the accompanying drawings, wherein:

FIG. is a view in perspective of one embodiment of the present invention;

FIG. 8 is a view in section taken along lines 8—8 of FIG. 2;

FIG. 9 is a view in section taken along lines 9—9 of FIG. 2;

FIG. 10 is a view in perspective of a drive cylinder suitable for use in the embodiment of FIG. 1;

FIG. 11 is a front view in plan of a second embodiment of the present invention;

FIG. 12 is a view in section taken along lines 12—12 of FIG. 11; and

FIG. 13 is a view in section taken along lines 13—13 of FIG. 12.

DESCRIPTION OF PREFERRED EMBODIMENTS

Figure 1:
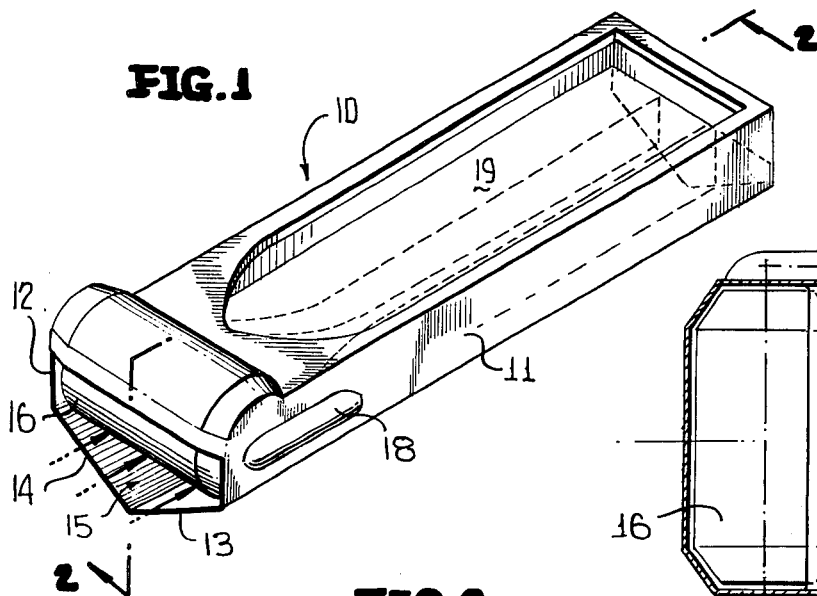
Figure 3:
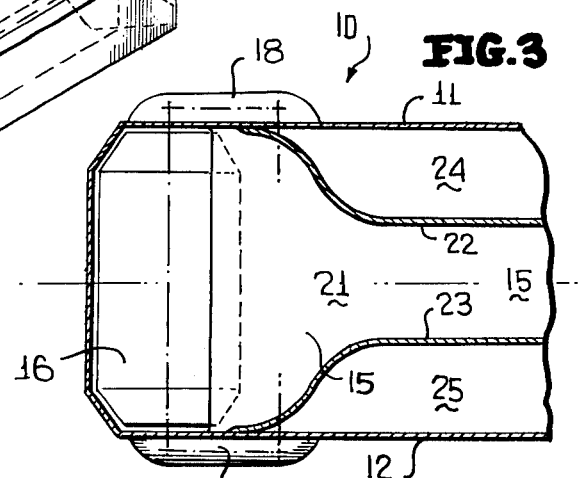
FIG. 3 is a view in section taken along lines 3—3 of FIG. 2.
Figure 2:
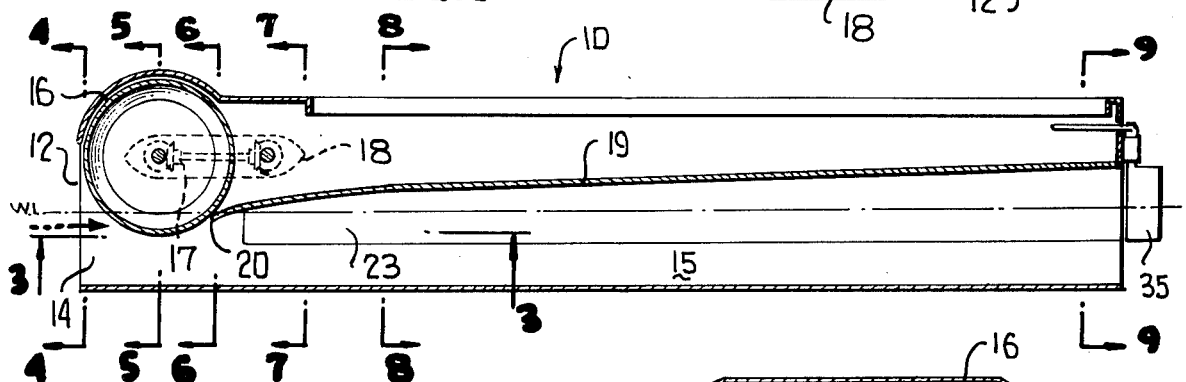
FIG. 2 is a view in section taken along lines 2—2 of FIG. 1.
Figure 4:
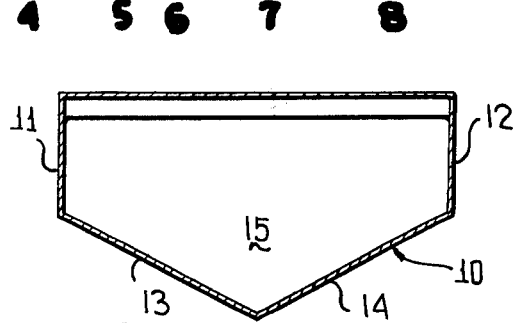
FIG. 4 is a view in section taken along lines 4—4 of FIG. 2.
Figure 5:
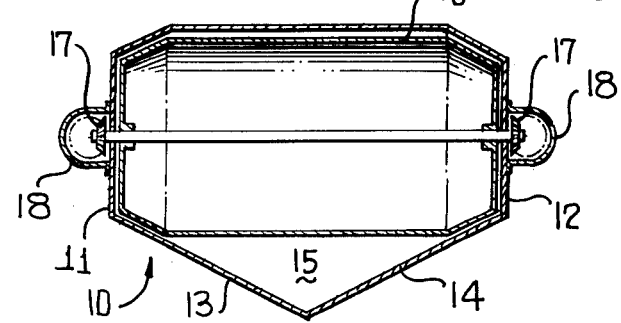
FIG. 5 is a view in section taken along lines 5—5 of FIG. 2.
Figure 6:
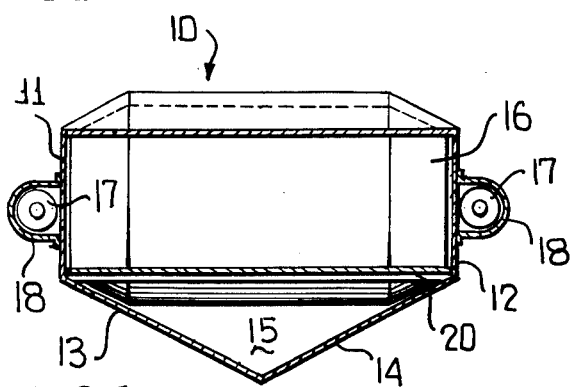
FIG. 6 is a view in section taken along lines 6—6 of FIG. 2.
Figure 7:
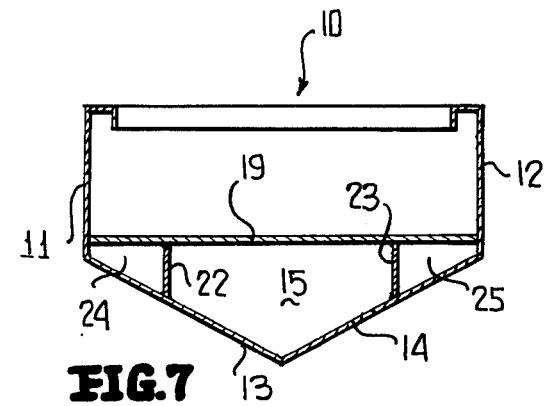
FIG. 7 is a view in section taken along lines 7—7 of FIG. 2.

Referring specifically to FIGS. 1–9 of the accompanying drawings, a marine vessel 10 includes a uniquely-configured displacement hull having side walls 11, 12 and bottom walls 13, 14, all of which extend substantially parallel to the longitudinal axis of the vessel along the entire vessel length. Side walls 11 and 12 are vertically oriented, although this is not a limiting factor on the invention. Bottom walls 13 and 14 converge downwardly toward one another to define a V-shaped bottom for the vessel. The bottom of the vessel is hollow and open at its ends, thereby defining a duct 15 through which water flows as the vessel is propelled. Duct 15 extends the entire length of the vessel and the inlet or forward end of the duct, located at the bow of the vessel, is completely open. The walls 11, 12, 13 and 14 at the duct inlet are configured of minimum thickness (i.e. — tapered to a sharp edge if desired) to minimize the surface area susceptible to frontal impact from the water. By configuring the walls with leading edges of minimum thickenss and parallel to the direction of vessel motion, the losses normally produced by frontal impact and frictional drag are significantly minimized. Moreover, the V-shaped bottom of the vessel acts as a stabilizing influence. That is, on the one hand the vessel bottom acts as a hydrodynamic surface which tends to stabilize the vessel against the action of wave motion that would otherwise cause pitching. On the other hand, as compared to a flat-bottomed vessel, the V-shaped bottom resists roll and yaw. The overall hull configuration thus permits smooth water flow through duct 15 and minimizes undesired motion of the vessel.

A reaction device, in the form of a drive cylinder 16, is positioned proximate the forward end of the vessel and extends substantially the full width of the hull. The cylinder, which need not be of purely right-circular cylindrical configuration, has its longitudinal axis disposed horizontally and perpendicular to the longitudinal axis of the vessel. A portion of cylinder 16 extends into duct 15 and is submerged below the vessel water line WL. The cylinder is rotated about its longitudinal axis by an engine or the like (not shown) through suitable gear trains 17 mounted on the vessel exterior and covered by a streamlined shroud 18. During forward propulsion of the vessel, the rotational direction of the cylinder is such that the submerged lower portion of the cylinder moves rearward (i.e. — counter-clockwise in FIG. 2). This motion imparts a rearward velocity to water in duct 15 in the manner to be described subsequently.

The top of duct 15 at its forward end is effectively defined by cylinder 16. That is, the forward end of the duct is completely open so that the rearwardly and downwardly curving periphery of cylinder 16 serves as its upper boundary. Since the cylinder is only partially submerged its frontal portion is exposed to air above the vessel water line. This air, as well as the water in duct 15, tends to be scooped into the duct by both the forward motion of the vessel and the viscous action produced by the rotating cylinder on the air. The vessel receives its thrust from the portion of the cylinder which passes through the water. On the other hand, the portion of the cylinder which to motion.

Rearward of cylinder 16 the top of duct 15 is defined by a top wall 19. The forward edge 20 of wall 19 extends horizontally from a location proximate the aft portion of the periphery of cylinder 16. Top wall 19 slopes upwardly from edge 20 in a downstream direction.

Beginning slightly aft of edge 20 and cylinder 16, the walls 22, 23 of duct 15 converge inwardly toward the duct center to define a venturi throat 21 therebetween. Rearward of throat 21 the walls 22, 23 remain parallel throughout, so that only the upward slope of top wall 19 provides an expansion of the flow region downstream of the throat.

The space defined between duct side wall 22, top wall 19, hull side wall 11 and bottom wall 13 constitutes a buoyancy chamber 24. A similar buoyancy chamber 25 is defined along the opposite side of the duct between walls 23, 19, 12 and 14. These buoyancy chambers may be filled with air or other water-buoyant material and serve to impart additional stability to the vessel. Duct 15 increases in cross-sectional area downstream of throat 21 by virtue of the upward slope of top wall 19. If wall 19 were to remain horizontal throughout its length, it would be necessary for walls 22, 23 to diverge downstream of throat 21 in order to provide the flow region expansion required to obtain venturi flow enhancement. However, if walls 22 and 23 were rendered divergent, buoyancy chambers 24 and 25 would be reduced in size and the buoyancy and stability of the vessel would be compromised. It is therefore important that top wall 19 be provided with an upward slope in a downstream direction to optimize both stability of the vessel and flow enhancement through duct 15. In operation, when cylinder 16 is rotatably driven, water in duct 15 is caused to flow rearwardly. Such flow imparts a reactive force on water behind the vessel which propels the vessel in a forward direction. Forward motion of the vessel causes increased water and air flow into duct 15, which flow experiences a significant velocity increase by virtue of the action of rotating cylinder 16. This accelerated fluid is thus effectively pumped into throat 21 by cylinder 16 where the fluid experiences still additional flow acceleration by virtue of the venturi action at the throat. The doubly accelerated fluid is issued from the downstream end of duct 15 where it imparts a reactive propulsive thrust to the vessel. This thrust is of course variable in accordance with rotational speed of cylinder 16 which in turn is operator-controllable.

The precise configuration of the cylinder 16 is dictated by the hull configuration and performance requirements. For example, as illustrated in FIGS. 1–3, 5 and 6, the cylinder may be tapered at its ends as necessary to conform to the configuration of walls 13, 14 at the bottom of duct 15. For higher speed operation the cylinder may be configured as cylinder 16a illustrated in FIG. 10. The periphery of cylinder 16a tapers from its longitudinal center towards its ends, having the greatest circumference at its center. Such a cylinder develops the highest fluid flow velocities at its center. The high flow velocity region is characterized by a relatively lower pressure so that flow tends to concentrate toward the center of the duct; this is a desirable feature since frictional forces between the flow and side walls are minimized thereby. As also illustrated in FIG. 10, the drive cylinder, regardless of configuration, may be provided with axially spaced thin rings 26 projecting radially from the cylinder periphery. Rings 26 serve a flow straightening function, minimizing turbulence and its inherent losses in the flow through duct 15.

In a second embodiment of the present invention, illustrated in FIGS. 11, 12 and 13 of the accompanying drawings, the reaction device takes the form of an air nozzle 30. Nozzle 30 is supplied with air from an inlet opening 31 at the bow of the vessel. Inlet opening 31 is defined above the inlet to water duct 15 and includes a ducted fan or propeller 32 which enhances the velocity of air flow toward nozzle 30. The top wall 33 of the inlet to water duct 15 is defined by the bottom wall of air inlet 31 and its leading edge is above water line WL as is the case for the embodiment of FIG. 1. Wall 33 slopes downwardly before terminating at nozzle 30 just above the water line.

Nozzle 30 extends entirely across the width of the hull. In this regard nozzle 30 may comprise a single elongated nozzle or a plurality of individual spaced nozzles. The nozzle terminates just above the water line and is directed rearward at a slight angle to the water line. In addition the center of nozzle 30 terminates forward of its sides, as best illustrated in FIG. 13. That is, the nozzle slants rearwardly, in a horizontal plane, from the duct center to the sides.

Nozzle 30 issues air into the duct at a velocity which depends upon the speed of operator-controlled propeller 32. The issued high velocity air jet tends to aspirate both air and water from upstream of the nozzle in duct 15. This imparts a defininte velocity component to fluid flow through the duct. In addition, the jet exerts a positive pressure on water entrapped in the duct. Since the nozzle 30 is angled slightly with respect to the water line, this pressure creates two force components on the entrapped water: one horizontal component and a lesser vertical component. The horizontal force component acts directly to increase the downstream flow velocity through throat 21. The vertical force component is prevented from exerting a lift force on the vessel because it is acting on water entrapped in duct 15 and not on water exterior to the hull. The vertical component therefore increases the pressure in the region upstream of throat 21, which in turn increases the flow velocity through the throat. The air nozzle thus utilizes frontal impact air as the source of a propelling force which is applied above and at a slight angle to the water line to more efficiently propel the vessel.

It should be noted that in the air nozzle embodiment the top wall 19 of duct 15, downstream of the nozzle, is not submerged as in the drive cylinder embodiment. Rather, top wall 19 extends from the top of the nozzle.

In the drive cylinder embodiment the direction of the vessel may be reversed by reversing the direction of cylinder rotation. In the air nozzle embodiment direction reversal is achieved by means of a slidable deflector panel 34 which can be selectively lowered into the water duct 15. Panel 34 extends the width of duct 15 and is slanted such that its bottom edge is forward of its top edge. When panel 34 is lowered, air issued from nozzle 30 is deflected from the panel to react on water in the forward end of duct 15. The reaction expels water from the forward end of the duct, propelling the vessel rearwardly.

Steering is effected in both embodiments by means of one or more controllable rudder vanes 35 located at the downstream end of duct 15. If a single vane 35 is employed it may be centered as illustrated; alternatively, a vane may be positioned on each side of the duct.

The propulsion systems described herein may serve as the primary propulsion source for all sizes and types of powered marine vessels. In addition these systems may serve as auxiliary power sources for sailing vessels. The air nozzle embodiment can be employed without fan 32 as a primary motive source for a sailing vessel by replacing air inlet 31 with an over-sized air duct capable of being rotated in all directions to harness available wind energy.

The major characteristics of the invention are: the completely open water duct 15, bounded only by walls parallel to the direction of motion; an efficient reaction device (16, 30) located proximate the forward end of the vessel to efficiently impart flow velocity components to the water in the duct; a venturi throat 21 in which the water velocity in duct 15 is further enhanced; stability-imparting buoyancy chambers (24, 25) extending most of the length of the vessel; and the V-shaped bottom of duct 15. These characteristics permit the effects of frontal impact water and air to be converted efficiently to propulsion forces in a stable vessel.

It should be pointed out that certain vessels may require a secondary reaction device for optimum propulsion.

It is important to stress that nozzle 30 is positioned so as not to be submerged during vessel operation.

With regard to the rotating drive cylinder embodiment, propulsion efficiency and craft stability depend upon the presence of duct 15. Specifically, tests have indicated that a drive cylinder employed in a craft without a duct to contain the flowing water tends to produce lift forces. These forces produce an unstable porpoising effect, particularly at high speeds. Moreover, losses similar to those encountered by air-cushioned vessels are experienced when no duct is present.

The preferably configuration for the hull buttom is the V-shape provided by bottom walls 13 and 14. This configuration has proved most advantageous for reasons discussed herein. On the other hand, other configurations (such as round bottoms, flat bottoms, inverted V bottoms, etc.) may be employed with the propulsion arrangements described herein without departing from the scope of the present invention in its broadest contexts.

While I have described and illustrated specific embodiments of my invention, it will be clear that variations of the details of construction which are specifically illustrated and described may be resorted to without departing from the true spirit and scope of the invention as defined in the appended claims.

I claim:

1. In a marine vessel of the hull displacement type wherein the vessel hull is partially submerged when said vessel is in motion, a propulsion system comprising:

a flow duct extending along the bottom of said hull, said duct being open at both ends and closed along its top, bottom and side walls, said duct being mostly submerged with the upper portion of its forward end extendng above the water line when said vessel is in motion;

a reaction device in the form of a driven cylinder located proximate the forward end of said duct and entirely within the confines of said hull, said cylinder having a longitudinal axis extending horizontally and perpendicular to the direction of vessel foward motion, the cylinder being positioned at a depth such that its periphery remains partially submerged during vessel motion, said cylinder having a plurality of spaced, thin annular members projecting from the cylinder periphery in vertical planes which are parallel to the direction of motion of said vessel, the cylinder periphery between said annular members comprising substantially smooth circumferential surfaces which are substantially devoid of projections therefrom, said cylinder being arranged to be rotatably driven in a first direction about its longitudinal axis such that said circumferential surfaces viscously force air and water under said cylinder and through said duct from forward of said vessel; and means for selectively rotating said cylinder about said longitudinal axis in said first direction;

wherein said top wall of said duct extends rearwardly from a leading edge thereof, said leading being positioned adjacent said cylinder and below the top of said cylinder, said leading edge extending the length of said cylinder to direct water and air driven by said cylinder into said duct in a rearward flow direction;

wherein the bottom and side walls of said duct extend forwardly of said leading edge of said top wall and at least as far forward as the forwardmost portion of said cylinder;

whereby water and air driven rearwardly through said duct by said cylinder initiates a reactive force which drives said vessel in a forward direction without imparting a lift force to said vessel.

2. The propulsion system according to claim 1 wherein the sides of said duct first converge in a rearward direction aft of cylinder to form a venturi throat for receiving and enhancing the flow velocity of water and air driven through said duct by said cylinder.

3. The propulsion system according to claim 2 further comprising a pair of buoyancy chambers disposed on opposite sides of said duct and extending over most of the length of said hull, each buoyancy chamber being defined between a respective side of said duct and a corresponding side of said hull.

4. The propulsion system according to claim 2 wherein said hull includes at least one bottom wall and two sidewalls joined by said bottom wall, said two sidewalls and said bottom wall extending parallel to vessel motion along their entire lengths to minimize frontal impact of said vessel against surrounding water when said vessel is in motion.

5. The propulsion system according to claim 4 wherein said bottom wall has a V-shaped transverse cross-section.

6. The propulsion system according to claim 4 wherein the forward edges of said sidewalls and said bottom wall are tapered to a sharp edge to further minimize resistance to flow.

7. The propulsion system according to claim 4 wherein said duct is bounded by a top wall extending from said cylinder to the stern of said vessel, said top wall having a leading edge positioned adjacent said cylinder and extending along the length of said cylinder near the water line of said vessel to direct water driven by said cylinder into said duct in a rearward flow direction.

8. The propulsion system according to claim 7 wherein said top wall slopes upwardly in a rearward direction aft of said venturi throat.

9. The propulsion system according to claim 1 wherein said hull includes at least one bottom wall and two sidewalls joined by said bottom wall, said two sidewalls and said bottom wall extending parallel to vessel motion along their entire lengths to minimize frontal impact of said vessel against surrounding water when said vessel is in motion.

* * * * *